Nov. 23, 1971                    W. B. WEED                    3,621,692
                    APPARATUS FOR SHAPING AND SIZING BALLS
Filed June 12, 1969                                      5 Sheets-Sheet 1

INVENTOR/S
WAYNE B. WEED

BY *Melville, Strasser, Foster and Hoffman*
ATTORNEYS

WAYNE B. WEED
BY *Melville, Strasser, Foster and Hoffman*
ATTORNEYS

INVENTOR/S

WAYNE B. WEED

BY *Melville, Strasser, Foster and Hoffman*
ATTORNEYS

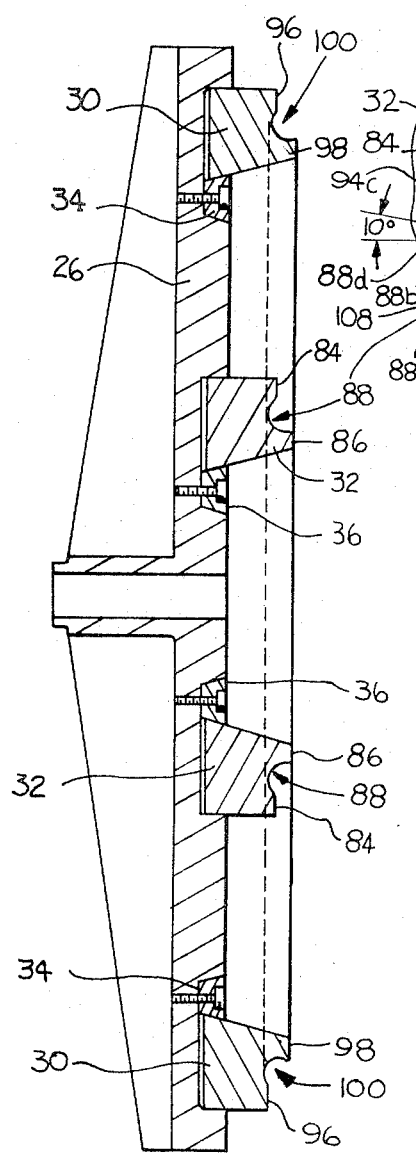

United States Patent Office 3,621,692
Patented Nov. 23, 1971

3,621,692
APPARATUS FOR SHAPING AND SIZING BALLS
Wayne B. Weed, Independence, Mo., assignor to Armco Steel Corporation, Middletown, Ohio
Filed June 12, 1969, Ser. No. 832,591
Int. Cl. B21h *1/14*
U.S. Cl. 72—93
21 Claims

ABSTRACT OF THE DISCLOSURE

A machine having a rotating die and a segmented stationary die defining therebetween a circular die passage so that when a ball is delivered to the die passage, movement of the rotating die will cause the ball to spiral through the circular die passage and discharge from the machine.

BACKGROUND OF THE INVENTION

The machine of this invention finds great and particular utility in the finishing of steel balls for use in grinding mills. According to conventional practice, red hot steel slugs will be formed as by shearing off short lengths of a heated steel rod. The slugs are generally forged to a rounded shape and delivered to a machine which will shape them into substantially a true sphere of an accurate size which is free from pits, flash, or other defects.

A typical device for accomplishing these results is described in detail in U.S. Pat. 2,178,031 in the name of Brandt. According to this patent, shaped slugs are delivered to the machine of that invention wherein the spherical shape is imparted by a rolling and sliding forging action. The rolling and sliding forging action, according to this patent, is accomplished radially. That is, the ball to be shaped and sized is spiraled through a circular die passage defined between an outer ring die member and an inner radial die member.

The patent just referred to also contemplates the progressive shaping of balls. That is, the machine described included three die passages, each of a definite size and arrangement, such that after a ball had traveled progressively through the three die passages, it would be discharged from the machine in a substantially truly spherical shape of a definite size.

SUMMARY OF THE INVENTION

The machine of this invention contemplates what might be called "pancake sizing." That is, the circular die passage is formed between circular guideways formed in opposing faces of a stationary die and a rotating die.

The stationary die is formed of a plurality of individual segments, each of which is movable radially with respect to the axis of rotation of the rotating member. In addition, the mating faces of the opposed guideways are formed as described hereinafter, so that in combination with the radial loading just described, the balls are caused to spiral through the die passage, and a substantially truly spherical shape is readily attained.

Furthermore, by virtue of the construction just described, the die life is greatly increased, without a corresponding increase in ball size due to die wear.

The preferred embodiment of the invention contemplates the provision of two co-planar, concentric die passages. Thus, the length of sliding and rolling forging action which can be attained in the machine of this invention is equal to or greater than the action attained in the three-stage machine described in the prior art.

In addition, the construction of this machine will permit the processing of a plurality of balls in each of the guideways at the same time. This in turn results in a greatly increased rate of production for the machine.

DESCRIPTION OF THE DRAWINGS

FIG. 10 is a plan view of the rotating finishing die.

FIG. 11 is a cross sectional view taken along the line 11—11 of FIG. 10.

FIG. 12 is a schematic cross sectional view showing the roughing die passage in detail.

FIG. 13 is a similar schematic cross sectional view showing the finishing die passage in more detail.

DESCRIPTION OF THE PREFERRED EMBODIMENT

Figure 1:
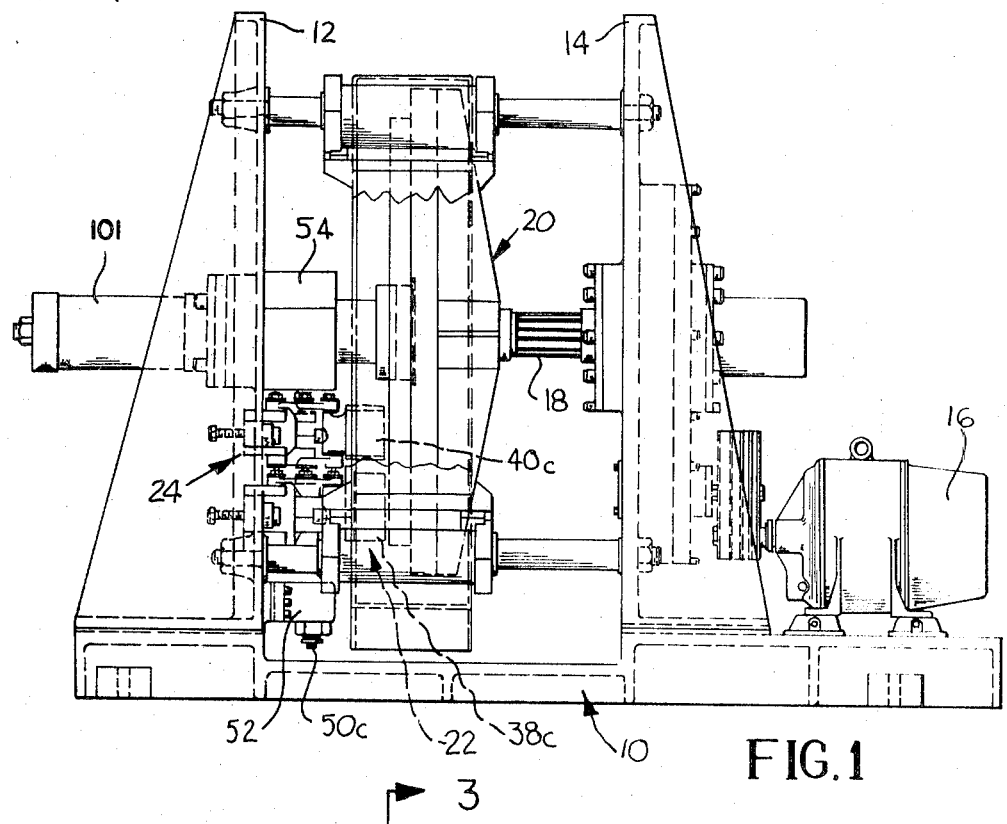
FIG. 1 is a side elevational view of the machine according to this invention.
Figure 2:
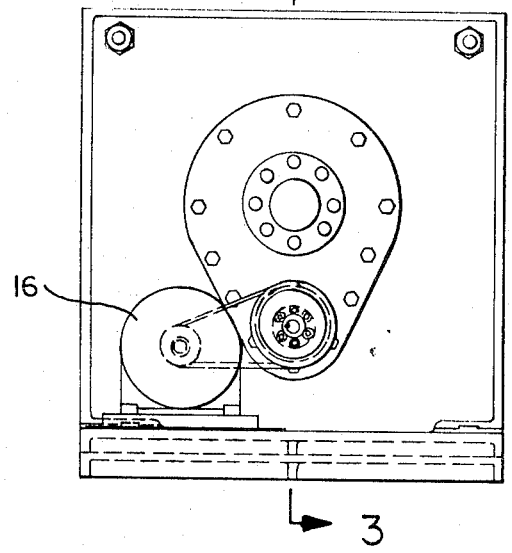
FIG. 2 is an end elevation of the machine of this invention.

Referring first to FIGS. 1 and 2, the basic layout of the machine of this invention will be described. The base of the machine is indicated at 10 and mounts the upstanding frame members 12 and 14.

The motor 16 or other suitable source of power drives the shaft 18 through a conventional drive train. The drive train in no way forms a part of this invention and will not be described hereinafter.

The rotating die member indicated generally in FIG. 1 at 20 is mounted on a shaft 18 for rotation therewith, but as explained hereinafter is slidable axially along with the shaft.

The stationary die member is indicated generally in FIG. 1 at 22. As will be explained in more detail hereinafter, the stationary die is comprised of a plurality of individual segments; the mounting for these segments is indicated generally at 24 in FIG. 1. The details of this mounting will be described in more detail in connection with the subsequent drawings.

FIG. 10 shows in plan view the rotating die member heretofore indicated generally at 20. As will be seen in this figure, the rotating die includes the circular mounting plate 26 which is keyed to the shaft 18 as at 28. The mounting plate 26 has a pair of coplanar, concentric recesses which receive the dies 30 and 32. It will be apparent from considering FIGS. 11 and 3 that the dies 30 and 32, respectively, are held in place by means of the retaining rings 34 and 36 which will be suitably fastened to the mounting plate 26. The outermost surface of each of the dies 30 and 32 is provided with a trough-shaped guideway described in detail hereinafter.

Figure 4:
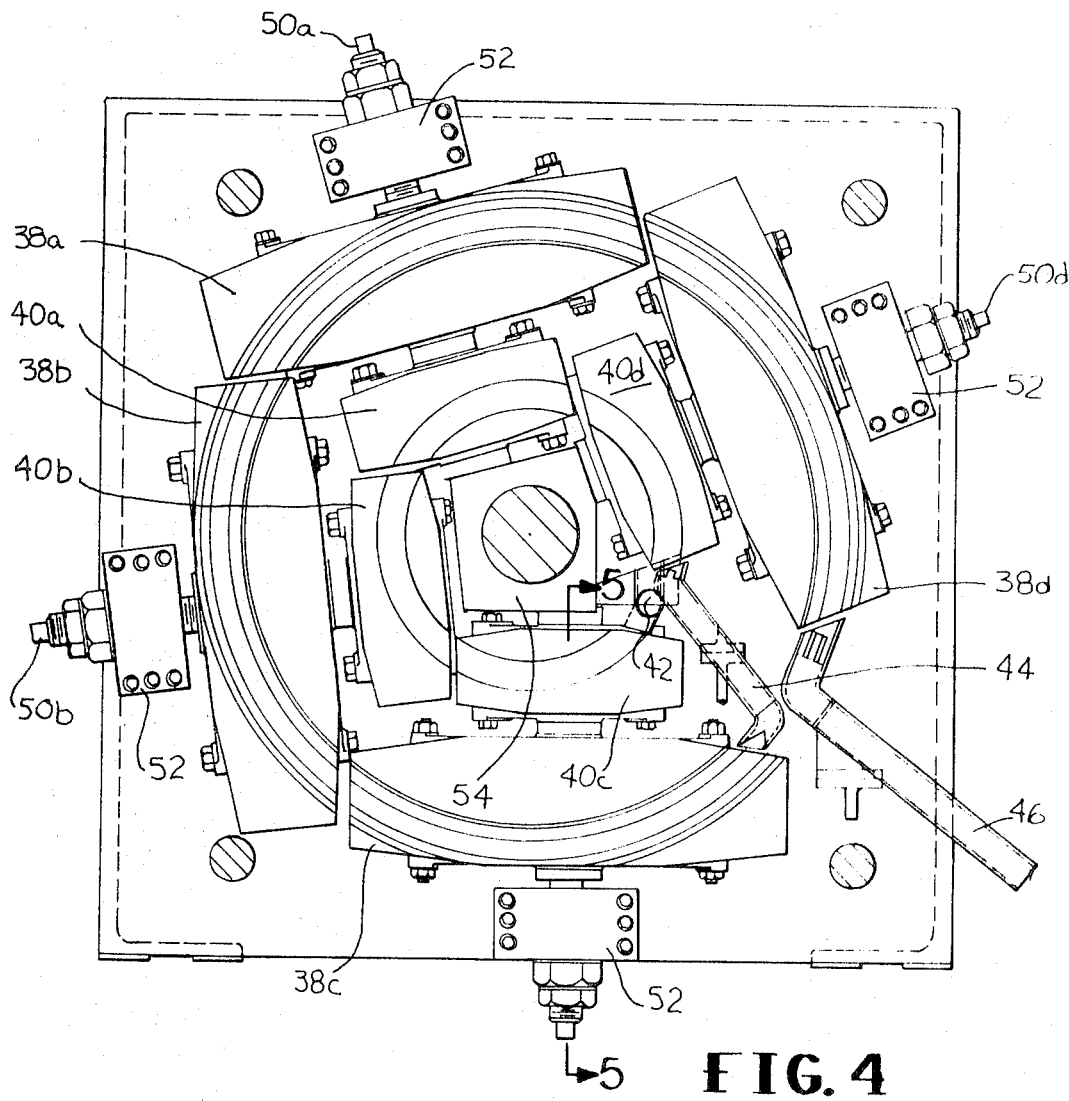
FIG. 4 is an elevational view of the stationary die member.

The stationary die heretofore generally indicated at 22 is seen in elevation in FIG. 4. It will be observed that the stationary die member includes a plurality of individual segments. The segments 38*a*, 38*b*, 38*c* and 38*d* together define a trough-shaped guideway which cooperates with the guideway in the die 30 to form a die passage. Similarly, the dies 40*a*, 40*b*, 40*c* and 40*d* define a trough-shaped guideway which cooperates with the guideway in the die 32 to form a second die passage.

In operation of the machine of this invention, a shaped grinding ball slug is delivered via the tube 42 to the die passage defined between the die 32 and the dies 40a, 40b, 40c, and 40d. Rotation of the rotating die 20 is effective to cause the ball to rotate through this die passage in a counterclockwise direction to the stationary tube 44 which transfers the ball to the die passage defined between the die 30 and the dies 38a, 38b, 38c, and 38d. Again, rotation of the rotating die member 20 is effective to cause the ball to move through the outer die passage to the discharge tube 46. This discharge tube provides a passageway for the finished ball to leave the machine and be conducted to a suitable storage receptacle.

The means for mounting each of the segments of the stationary die 22 is shown in detail in FIGS. 4 through 9. By way of general explanation, each segment of the stationary die is mounted for pivotal motion about an axis lying in a plane parallel to the plane of the die passages, and in a second plane parallel to a radius of the die passages.

As seen in FIGS. 4 through 9, shafts 50a, 50b, 50c and 50d are provided respectively for the stationary die segments 38a–40a, 38b–40b, 38c–40c, and 38d–40d. All of these shafts, as stated earlier, lie in a plane parallel to the plane of the die passages, and extend generally toward the axis of rotation of the rotating die member 20. In addition, as best seen in FIG. 4, each of the shafts 50a–50d lies in a plane parallel to but offset from a radius of the die passages.

One end of each of the shafts 50a–50d is received in the mounting block 52, which is suitably attached to the framework of the device. The opposite end of each of the shafts 50a–50d is received in the casting 54 surrounding the hydraulic cylinder to be discussed presently.

It will be apparent that the mounting means for the inner stationary dies 40a–40d is structurally identical to the mounting means for the outer stationary dies 38a–38d. Hence, only one set of mounting means will be discussed in detail, it being understood that the description is applicable to both.

Figure 5:
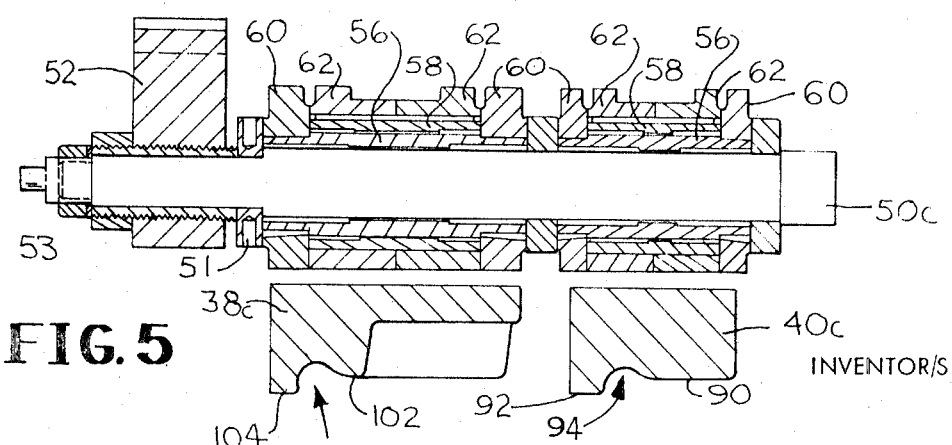
FIG. 5 is a cross sectional view along the line 5—5 of FIG. 4.
Figure 6:
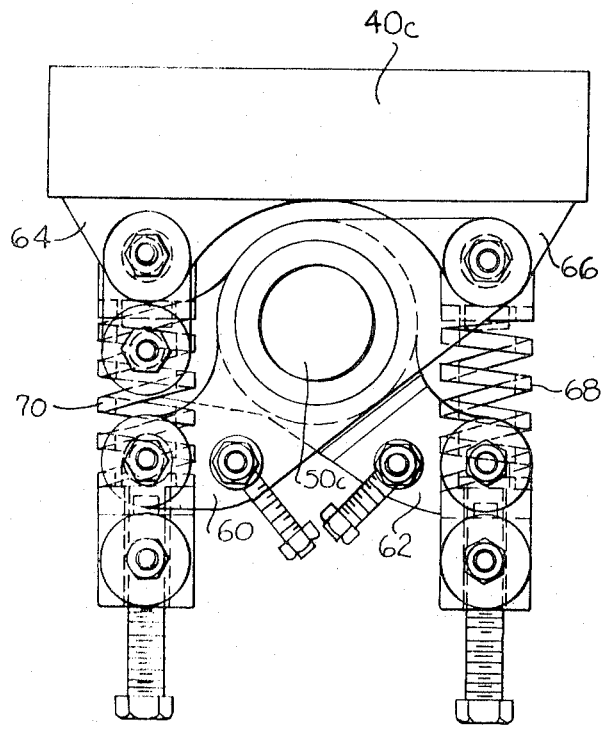
FIG. 6 is an elevational view showing the mounting for the roughing die.

As seen in FIG. 5, the mounting includes a sleeve member 56 which is mounted on the shaft 50c for pivotal motion therealong, and the sleeve 58 is rotatably journaled about the sleeve 56. The arms 60 are secured as by keys to the sleeve 56, and the arms 62 are similarly secured to the sleeve 58. Opposite ends of the arms 60 and 62 will be secured to lugs 64 and 66, respectively on the back surface of the die itself (see FIGS. 6 and 8). The springs 68 and 70 respectively tend to urge the free end of the arms 60 and 62 from the opposite ends of the respective arms.

Figure 7:
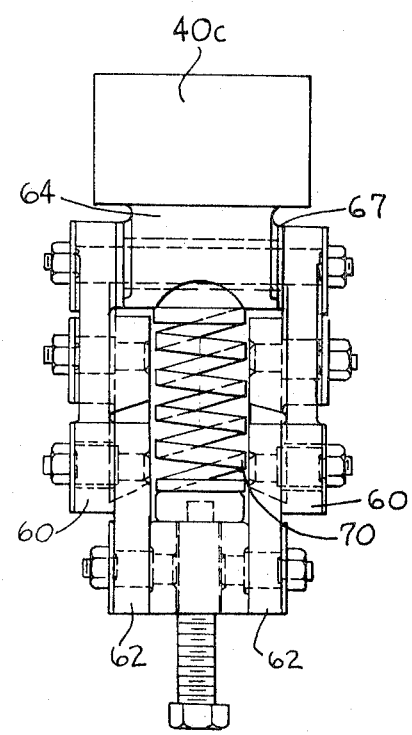
FIG. 7 is an elevational view perpendicular to the view of FIG. 6 of the roughing die.
Figure 8:
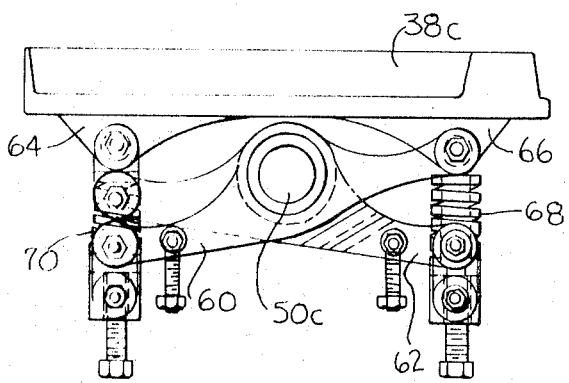
FIG. 8 is an elevational view of the finishing die mounting.
Figure 9:
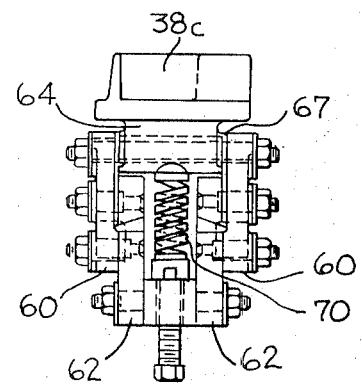
FIG. 9 is an elevational view perpendicular to the view of FIG. 8 of the finshing die mounting.

Shaped slugs as delivered from the machine of this invention will vary in size by 4% or more. To allow for this size variation 60 Durometer urethane washers are utilized between the lugs 64 and 66 and the respective arms 60 and 62 on the outside of the dies as shown in FIGS. 7 and 9.

It was indicated at the outset that the shaped slugs delivered to the machine of this invention will be red hot, and that the shaping and sizing is accomplished by a rolling and sliding forging action. The spring biased, pivotal mounting construction just described will permit deflecation of the stationary die away from the rotating die to accommodate a slug having flash or a flat portion when it is first delivered to the die passage. The forging action effected upon the slug in the die passage will gradually shape it into true spherical form, with the spring bias mounting just described biasing the stationary dies into the proper relationship to the rotating die.

The segmented structure of the stationary die provides several very important advantages. Specifically, it will be possible for up to eight slugs to be in each die passage at any given time, (two slugs per stationary die segment) and still achieve a uniform shaping and sizing operation. This would not be possible if the stationary die components were integral. It will of course be apparent that the machine of this invention is therefore capable of much higher production speeds than those heretofore developed.

Referring now to FIGS. 12 and 13, the preferred configuration for the cooperating, trough-shaped guideways will be described. In these figures:

D = ball diameter
R = approximately 25% of D
O = approximately 40% of D
r = approximately 7½% of D.

The lines 80 and 82 lie in the planes traversed by a ball in passing through the roughing die passage and the finishing die passage respectively.

Considering first FIG. 12, it will be seen that the outer face of the die 32 includes the generally flat portions 84 and 86, and the trough-shaped guideway indicated generally at 88 formed therebetween. Similarly, the stationary die segment 40c includes the generally flat portions 90 and 92, and the trough-shaped guideway indicated generally at 94. It will be apparent from the diagram of FIG. 12 that the surfaces 84 and 90 are offset in opposite directions from the line 80 by a distance approximately equal to 40% of the diameter of the ball being sized, while the surfaces 86 and 92 are offset to the opposite side of the center line 80 by a distance approximately equal to 25% of the ball diameter.

The guideways generally indicated at 88 and 94 are identical in configuration. They include the arcuate portions 88a and 94a respectively extending from the center line 80 to the points 88b and 94b. As seen in the drawings, the total arc length of the parts 88a and 94a is 100°. Adjacent the inner end of the arc 88a and the outer end of the arc 94a are the rounded corners 88c and 94c respectively, and adjacent the opposite end of the respective arcs are the relieved portions 88d and 94d.

The configuration of the finishing die passage defined between the rotating die 30 and the stationary die segment 38c is shown in FIG. 13. The outer face of the rotating die 30 includes the flat portions 96 and 98, and the trough-shaped guideway indicated generally at 100 therebetween. The outer face of the stationary die segment 38c includes the flat portions 102 and 104, and the trough-shaped guideway indicated generally at 106. The offset of the flat portions 98 and 104 from the center line 82 corresponds exactly to the offset of the flat portions 86 and 92 described above, and the offset of the surfaces 96 and 102 corresponds to the offset of the surfaces 84 and 90 described above.

The arcuate portions 100a and 106a extend respectively from the points 100b and 106b to the points 100c and 106c. It will thus be apparent that the arcuate portions of these guideways are somewhat in excess of 100°.

On opposite ends of the arcuate portions 100a and 106a are the rounded corners 100d, and adjacent the other end of the arcuate portions are the relieved areas 100e and 106e.

It should be apparent from considering the die passages formed by the mating guideways described above that a ball will be in contact with the opposed dies only in the areas of the arcuate portions 88a–94a, and 100a–106a. It will also be apparent that these arcuate contact areas are respectively disposed on opposite sides of the lines 80 and 82. The offset of these contact areas causes the shaped slug or ball to roll on constantly changing axes so that the entire surface of it is subjected to the forging action of the contact areas of the die passages.

The lines 108 and 110 in FIGS. 12 and 13 respectively extend between the centers of the arcuate portions 88a, 94a, and 100a, 106a. The inclination between the line 108 and the line 80 is substantially 50°, while the inclination between the line 110 and the line 82 is approximately 55°. Successful operation of the machine of this invention requires that the line between the centers of mating arcuate portions be inclined within 10% of the above exemplary figures.

In order to achieve the spiral, rolling action of the ball described earlier, a load must be applied from two directions. That is, the respective mating guideways forming a die passage must be urged toward each other; and in addition, one element forming each die passage must be moved radially with respect to the other.

The radial movement just described is accomplished by means of the mounting for the stationary dies heretofore described. That is, it will be apparent that the shafts 50a–50d include threaded portions engaging the mounting blocks 52. Rotation of the shaft by means of the adjusting nut 51 is effective to move the entire shaft and die mounting assembly as a unit. (The inner end of the shafts 50a–50d is slidable in the casting 54.) It may be secured in position by the lock nut 53.

Figure 3:
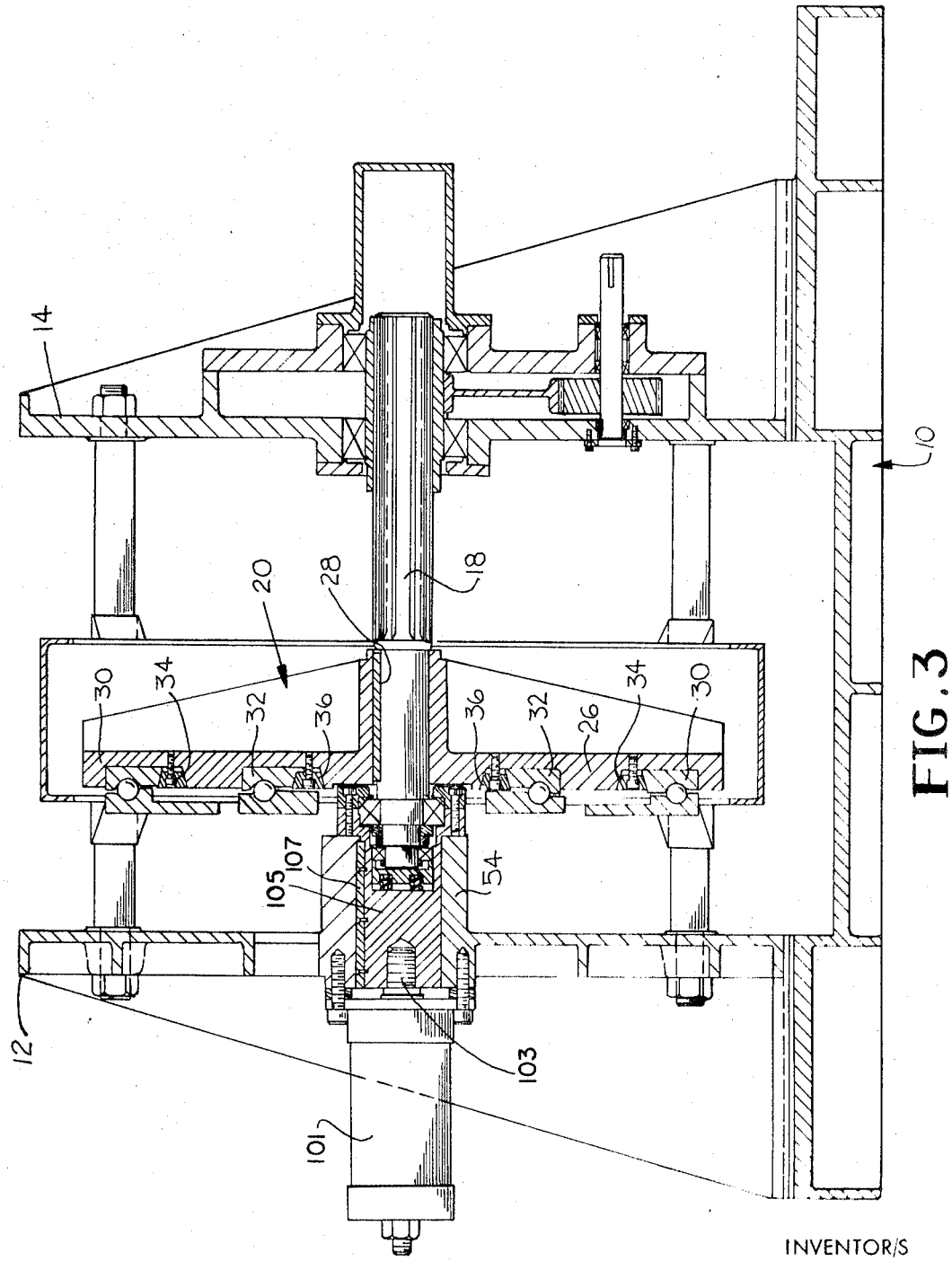
FIG. 3 is a partial cross sectional view along the lines 3—3 of FIG. 2.

The urging of the mating guideways toward each other is accomplished by means of the adjustable stroke hydraulic cylinder 101. The adjustable stroke cylinder is necessary to offset die wear and die redressing. As best seen in FIG. 3, the piston 103 of the hydraulic cylinder is secured to the bearing housing 105, which is in turn keyed as at 107 to the casting 54. This construction permits sliding movement between the bearing housing 105 and the casting 54, but prevents relative rotational movement. A recess in the right-hand end of the bearing housing (as seen in FIG. 3) carries a plurality of bearings supporting one end of the shaft 18.

It should thus be apparent that actuation of the hydraulic cylinder 101 is effective to move the entire rotating die assembly toward and away from the stationary dies.

Within the scope of the invention, the device may be equipped with a limit switch (not shown) which is arranged to sense an overload condition within any given die passage. Upon the occurrence of such a condition, the limit switch will be actuated. The limit switch in turn controls the flow of fluid to the hydraulic cylinder 101 and is effective, upon the occurrence of such a condition, to move the rotating die member away from the stationary dies, thereby automatically clearing the jam and preventing resulting damage to the machine.

Many modifications may be made in the structure described without departing from the scope and spirit of this invention. No limitations are to be inferred or implied except as specifically set forth in the claims which follow.

The embodiments of the invention in which an exclusive property or privilege is claimed are defined as follows:

1. A machine for shaping and sizing balls comprising:
   (a) first die means having an outer surface, said surface having a circular trough-shaped guideway;
   (b) second die means having a mating surface, said surface having a circular trough-shaped guideway cooperating with said first mentioned guideway to define a ball passage, said cooperating trough-shaped circular guideways in said first and second die means respectively having arcuate portions to contact areas of a ball cross a diameter angularly related to the plane through which the center of said ball moves in said die passage;
   (c) means for delivering a ball to said die passage; and
   (d) means for rotating one of said die means to move said ball through said die passage.

2. A machine for shaping and sizing balls comprising:
   (a) rotary die means having a circular guideway in one face thereof;
   (b) stationary die means including a plurality of segments and having a guideway in one face thereof cooperating with said guideway in said rotary die means to define a die passage.
   (c) means for biasing said rotary die means and said stationary die means toward each other;
   (d) means for biasing each segment of said stationary die means radially toward the axis of rotation of said rotary die means;
   (e) means for delivering a ball to said die passage; and
   (f) means for rotating said rotary die member to move said ball through said die passage.

3. The machine claimed in claim 1 wherein said rotary die means includes a second circular guideway concentric with said first mentioned circular guideway, and including a second stationary die means having a plurality of segments and having a guideway cooperating with said second guideway in said rotary die means to define a second die passage.

4. The machine claimed in claim 3 including stationary passage means extending between said first and second die passages.

5. The machine claimed in claim 4 wherein the radius of said first mentioned die passage is smaller than the radius of said second die passage; and including second stationary passage means communicating with said second die passage for receiving a ball therefrom and discharging it from said machine.

6. The machine claimed in claim 2, including a shaft for each segment of said stationary die means, each said shaft lying in a plane parallel to the plane of said die passage and extending generally toward the axis of rotation of said rotary die means, and means for pivotally mounting each segment of said stationary die means on one of said shaft.

7. The machine claimed in claim 6 wherein each said shaft lies in a plane parallel to the plane of the die passage and in a second plane parallel to a radius of said die passage.

8. The machine claimed in claim 2 wherein said stationary die means includes four segments, each said segment defining an arc on the order of 80°.

9. The machine claimed in claim 3 wherein said second stationary die means includes the same number of segments as said first mentioned stationary die means.

10. The machine claimed in claim 9 including a shaft for each segment of said first mentioned stationary die means, each said shaft lying in a plane parallel to the plane of said die passages and extending generally toward the axis of rotation of said rotary die means, and means for pivotally mounting one segment of said first mentioned stationary die means and one segment of said second stationary die means on one of said shafts.

11. The machine claimed in claim 6 wherein said means for biasing each segment of said stationary die means radially toward the axis of rotation of said rotary die means comprises means for moving said shaft radially.

12. The machine claimed in claim 6 wherein said means for pivotally mounting each said segment of said stationary die means on said shaft comprises a first sleeve member mounted on said shaft for pivotal motion therealong; a second sleeve rotatably mounted about said first sleeve; a first arm secured to said first sleeve; a second arm secured to said second sleeve; one end of said first arm being secured to a segment of said stationary die means; one end of said second arm being secured to said segment of said stationary die means; means biasing the other end of said first arm away from said one end of said second arm; and means biasing the other end of said second arm away from said one end of said first arm.

13. The machine claimed in claim 2 wherein said rotary die means is slidable along its axis of rotation, and including means for sliding said rotary die means away from said stationary die means.

14. The machine claimed in claim 1 wherein said diameter is inclined to said plane by at least 45° and not more than 60°.

15. The machine claimed in claim 1 wherein said trough-shaped guideway in said one of said die means is relieved about its inner periphery.

16. The machine claimed in claim 1 wherein said trough-shaped guideway in said other one of said die means is relieved about its outer periphery.

17. The machine claimed in claim 1 wherein said first die means has two concentric outer surface portions, each said outer surface portion having a circular trough-shaped guideway; wherein said second die means has two surfaces mating respectively with said surface portions of said first die means, each said surfaces of said second die means having a circular trough-shaped guideway cooperating respectively with said guideways in said first die means to define two concentric circular die passages; and including stationary passage means extending between said two die passages.

18. The machine claimed in claim 1 wherein the other of said first and second die means includes a plurality of individual segments.

19. The machine claimed in claim 18 wherein each of said individual segments is movable radially, and including means for moving each said segment radially.

20. The machine claimed in claim 19 wherein each said segment is mounted for pivotal motion about the path of radial movement.

21. The machine claimed in claim 19 wherein the path of radial movement of each said segment lies in a plane parallel to the plane of said die passage and in a second plane parallel to and offset from a radius of said die passage.

References Cited
UNITED STATES PATENTS 1,695,195  12/1928  Magann _____ 72—89

ANDREW R. JUHASZ, Primary Examiner

U.S. Cl. X.R.

29—148.4